US012422335B2

(12) United States Patent
Kludt et al.

(10) Patent No.: US 12,422,335 B2
(45) Date of Patent: Sep. 23, 2025

(54) CALIBRATION OF A LIGHT-FIELD GENERATION DEVICE

(71) Applicant: FRAUNHOFER-GESELLSCHAFT ZUR FÖRDERUNG DER ANGEWANDTEN FORSCHUNG E.V., Munich (DE)

(72) Inventors: Christian Kludt, Karlsruhe (DE); Marcos López Martinez, Karlsruhe (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 230 days.

(21) Appl. No.: 18/250,381

(22) PCT Filed: Oct. 26, 2021

(86) PCT No.: PCT/EP2021/079614
§ 371 (c)(1),
(2) Date: Apr. 25, 2023

(87) PCT Pub. No.: WO2022/090193
PCT Pub. Date: May 5, 2022

(65) Prior Publication Data
US 2023/0417629 A1    Dec. 28, 2023

(30) Foreign Application Priority Data
Oct. 26, 2020   (DE) .................... 10 2020 128 141.2

(51) Int. Cl.
*G01M 11/06*   (2006.01)
*G01M 11/02*   (2006.01)

(52) U.S. Cl.
CPC ...... *G01M 11/065* (2013.01); *G01M 11/0264* (2013.01)

(58) Field of Classification Search
CPC ..................... G01M 11/065; G01M 11/0264
USPC .......................................................... 356/121
See application file for complete search history.

(56) References Cited

U.S. PATENT DOCUMENTS 10,260,864 B2*  4/2019  Edwin ................ G02B 27/01
10,701,349 B2*  6/2020  Ng ..................... H04N 13/307

FOREIGN PATENT DOCUMENTS

CN   110132544 A      8/2019
DE   102009054232 A1  5/2011
DE   102017100676 A1  7/2018

OTHER PUBLICATIONS

German Patent Office, Examination Report in German Patent Application No. 10 2020 128 141.2 (Sep. 15, 2021).
(Continued)

*Primary Examiner* — Seung C Sohn
(74) *Attorney, Agent, or Firm* — Leydig, Voit & Mayer, Ltd.

(57) ABSTRACT

Disclosed is a method for calibrating a light field generating device, which has a display unit with pixels for generating light and a lens field unit with optical lenses for deflecting the light generated by the display unit, and a control unit for controlling the display unit, each lens of the lens field unit being assigned a plurality of pixels of the display unit. Also disclosed are a light field generating device based on the above method and an illumination device having the disclosed light field generation device.

14 Claims, 2 Drawing Sheets

(56) References Cited

OTHER PUBLICATIONS

Figure 1:
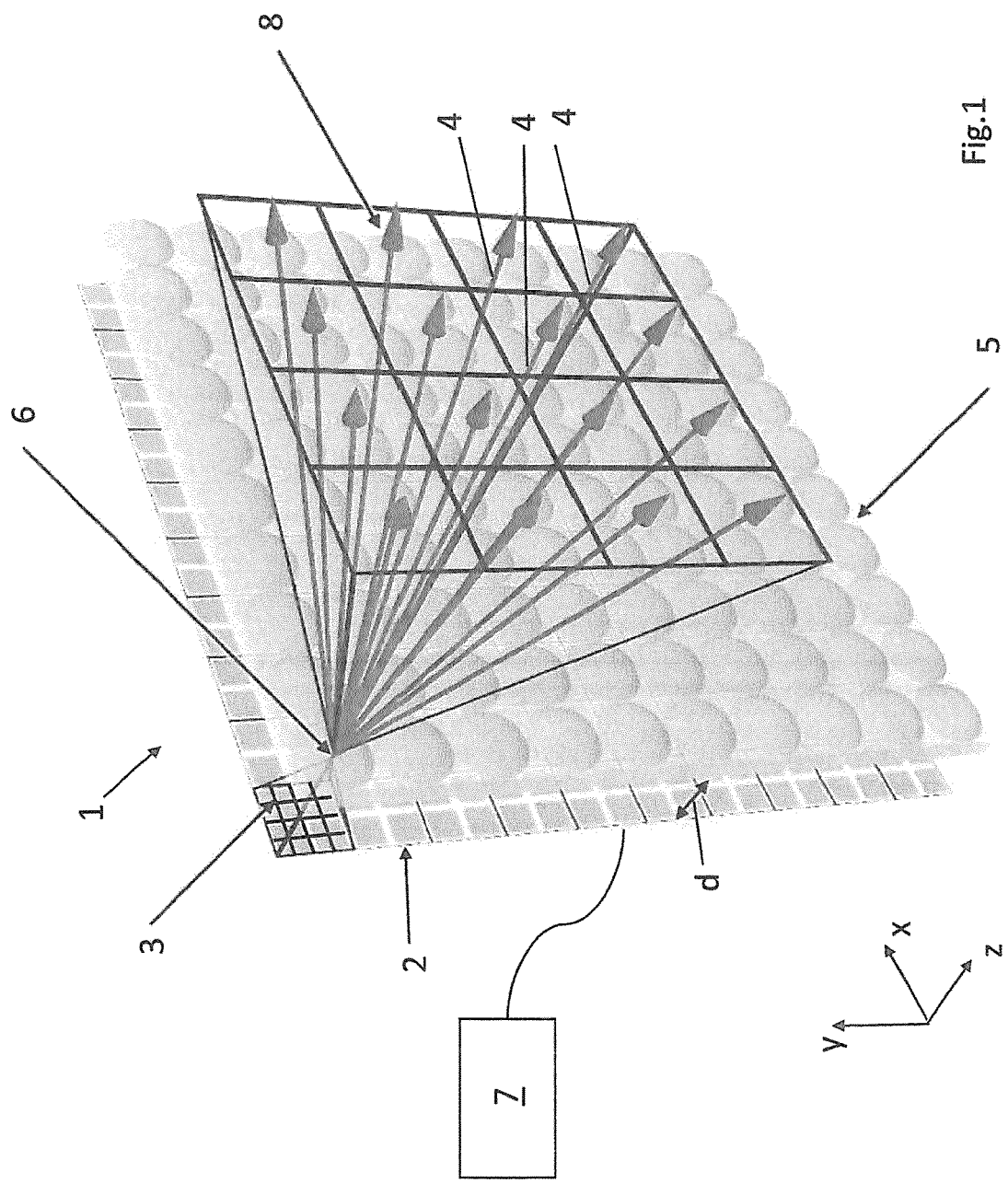

European Patent Office, International Search Report in International Application No. PCT/EP2021/079614 (Jan. 25, 2022).
European Patent Office, Written Opinion in International Application No. PCT/EP2021/079614 (Jan. 25, 2022).
International Bureau of WIPO, International Preliminary Report on Patentability in International Application No. PCT/EP2021/079614 (May 2, 2023).

* cited by examiner

CALIBRATION OF A LIGHT-FIELD GENERATION DEVICE

CROSS-REFERENCE TO RELATED APPLICATIONS

This patent application is the U.S. national phase of International Application No. PCT/EP2021/079614, filed on Oct. 26, 2021, which claims the benefit of German Patent Application No. 10 2020 128 141.2, filed Oct. 26, 2020, the disclosures of which are incorporated herein by reference in their entireties for all purposes.

The invention relates to a method for calibrating a light field generating device, which has a display unit with pixels for generating light and a lens field unit with optical lenses for deflecting the light generated by the display unit, and a control unit for controlling the display unit, each lens of the lens field unit being assigned a plurality of pixels of the display unit.

The generation of controllable light or radiation fields, in which a light, which here is also generally understood to mean electromagnetic radiation, can not only be generated with high spatial and temporal resolution, but also a direction of propagation of the light, i.e. a directionality of the generated radiation, can be controlled with as differentiated an angular resolution as possible, is strived for in many different fields of technology. For example, the exact nature of the light field plays an important role in scientific or industrial visual inspection, the optical inspection of samples. In this case, the image processing chain includes the components of illumination, light-material interaction (transmission, refraction/distraction, reflection, scattering), image acquisition, digitization, data evaluation, classification and decision. For reliable performance, it is crucial to extract the features of the sample with a high contrast. The most effective approach here is generally to control the image generation process directly in the first step, the lighting. Accordingly, there are a variety of common illumination configurations in which bright-field and dark-field illumination with both incident and background illumination are used to highlight different structures of the sample, depending on the direction of the incident light on the sample.

Test objects or samples with complex geometries require a complicated illumination setup, which is often realized by adding further light sources. Selecting, adding, adjusting and testing the different light sources in the various configurations is a time-consuming and hardware-intensive process. Different radiation characteristics such as a directed light, a diffuse light, a structured light, a colored light, and more have to be tested. Due to the physically limited installation space, positioning problems are also quickly encountered, as often not all lighting components can be arranged in what is actually the ideal position.

Accordingly, a visual inspection device for optically inspecting a sample that combines as many illumination modalities as possible in a single device in an easily configurable manner would be desirable here.

One approach is to use several individual light sources, which are located on a hemisphere, on a half or full cylinder or on other curved surfaces, in the center of which the sample to be illuminated is to be placed. The individual light sources can also be arranged on a flat surface. By activating individual light sources or respective groups of light sources, the direction of illumination can thus be changed in a targeted manner without, however, still being able to adjust the radiation directions of the individual elements. Another approach is hemispherical illumination patterns, in which light from a projector is directed from many different directions onto a sample at the focal point of the reflector via a Fresnel lens and a parabolic reflector.

Another approach is a multi-channel imaging system such as Fraunhofer IOSB's Purity inspection system, in which images are acquired simultaneously from different directions of illumination. A suitable illumination channel is implemented for each of the different types of defects, ensuring an image with maximum contrast: absorbing inclusions appear dark in a bright-field channel, scattering defects such as trapped air bubbles appear as bright spots in a dark-field image, and scattering defects on an object surface such as scratches or dust are made visible under grazing illumination. The Purity inspection systems from IOSB Fraunhofer can use more than 64 different illumination channels. However, the radiation direction of the individual modules is also fixed here and cannot be varied.

Another application of controllable light fields are camouflage systems, which mask an object, which can also be a human, by displaying a pattern similar to the background of the respective object. Such subsystems are commercially common and available, but may be very noticeable in parallax observations. This is usually the case when an observation of the camouflaged object is made from different directions, since each individual observer sees a slightly different background and the camouflage pattern of the camouflage system cannot be optimally adapted for all viewing angles at the same time. A camouflage system which realizes a directional display of the background would allow an optimal masking independent of the observation angle, i.e. stealth.

This is not the case in currently available systems such as ACAMSII, CAMELEON, or ADAPTLED. In ADAPTLED, for example, the radiation of radiant tile elements is continuously adjusted to a measured background by means of closed-loop control. However, such tiles do not have a controllable directional distribution of radiation, so that the identical camouflage pattern is emitted in all spatial directions in both visible light and infrared radiation applications.

The more commonly known approaches to research in the field of light field generation focus substantially on the field of consumer electronics. As is known, a normal monitor can only vary the light emission spatially and temporally by changing the brightness of individual pixels (e.g. LED pixels) in a pixel matrix in a time-dependent manner. The direction of the light emission cannot be controlled, so that an observer sees the same image from any viewing angle.

This is different in so-called light field displays. These can vary the light emission both spatially and directionally. This allows a spatially structured image, a 3D image, to be emitted in a targeted manner, so that different image content can be displayed for multiple viewers at different positions using a single device. This means that three-dimensional image content can also be displayed without the viewer needing suitable 3D glasses or the like to feel the three-dimensional impression. This is also possible for several viewers at the same time. Such displays are also called autostereoscopic displays.

The directional display of information on a single display, i.e. the simultaneous display of different information in different directions by a single display are also desirable in public spaces or at large events. It would be advantageous, for example, to have a notification device for displaying safety, warning or rescue information, and also an advertising device for displaying advertising information, which can be mounted conspicuously in a central location and yet still convey individualized information to viewers at different positions, i.e. for the display from different viewing directions. For example, in the event of an evacuation, such a display can be used to provide viewers at different locations with adapted indications of respective different optimal escape routes by means of a single central and clearly visible notification device.

No such measures have been implemented to date. The approaches known from consumer electronics are unsuitable for applications at a distance, where the observer is located at a greater distance, for example more than 10 m, from the light field generating device, or for industrial visual inspection, where a particularly large angular accuracy, i.e. a large directional resolution, must be achieved.

Some examples of light field generation with directionality controllable light fields are referenced below.

Volumetric display: as in the Voxon Photonix or 3600 light field display from the USC Institute for Creative Technologies, the desired scene is displayed in a three-dimensional production volume.

2-D rendering and tracking: this method is currently the most widely used in the field of virtual and augmented reality. On a normal 2D screen, in conjunction with position tracking of the observer, the displayed scene is permanently recalculated and rendered to create the subjective impression of a three-dimensional representation for the observer. An example for this is Microsoft Hooligans.

Parallax barriers: Here, information, images, or scenes reproduced in different directions are separated from each other with light blockers or optically anisotropic materials. This is, for example, the technology chosen for the Nintendo 3DS.

Multi-layer LCD: here, the separation of differently aligned information, images or scenes is achieved by activating several LCD layers on top of each other. This forms a "transmission tube" in which the transmission direction can be varied over time. One example here is MIT's "tensor display".

Projector technology: here, radiation from one or more projectors is used in conjunction with an "angle expanding screen" to create directional displays. One example here is MIT's "compressive light field projection system."

Microlens array: the operating principle is based on the inversion of the optical elements of a light field camera, wherein a microlens array, i.e. a lens field unit with a large number of small optical lenses, which can also be referred to as a lens array, is attached to a screen, i.e. a display unit with controllable pixels. This achieves a pixel-dependent radiation direction. With such a microlens field-based light field generation device, the radiation direction of the displayed information, images or scenes can be specifically adjusted by means of a targeted activation of the pixels assigned to different radiation directions in each case. Most systems on the market can only vary the direction of radiation in one spatial plane, generally in the horizontal spatial plane. Currently, up to 70 different beam angles can be realized with commercially available systems in the horizontal plane, i.e. a directional resolution of 70 directions can be achieved in the horizontal plane. For a combination of horizontally and vertically varying radiation directions, i.e. deflecting the light generated by the respective pixels in two spatial planes, the directional resolution in the solution proposed by the company FOVi3D is currently limited to about 50 directions (horizontal and vertical together).

The present invention is based on the task of overcoming disadvantages of the known light field generating device and providing a light field generating device that can be used flexibly in the simplest possible technical manner.

This object is solved by the description and the figures provided and advantageous embodiments thereof.

One aspect relates to a method for calibrating a light field generating device, which may also be referred to as a light field emitter or light field generator. Light field generating device also means a light source device in which the spatial position, the time as well as the direction of the light emission can be controlled, i.e. varied in a targeted manner. The term light here includes both electromagnetic radiation in the spectral range visible to humans, i.e. from 380-780 nm, and electromagnetic radiation with wavelengths in the violet spectral range, i.e. with wavelengths between 10 and 380 nm, as well as electromagnetic radiation with wavelengths in the infrared spectral range, i.e. with wavelengths from 780 nm to 50 µm.

Accordingly, the light field generation device presently has a display unit with Bildpunkten, for example pixels, LED light sources or other individual light sources, for generating light. Preferably, the pixels are arranged in a matrix, usually a planar matrix. The time and spatial position of the light generation is determined accordingly by the display unit. The light field generating device also has a lens field unit with optical lenses for deflecting the light generated by the display unit. The lens field unit, which may also be referred to as a lens array or microlens array, is arranged in front of the display unit, which may be a commercially available monitor, preferably at a distance equal to the focal length of the individual optical lenses. If an pixel is now activated, i.e. used to generate light, the associated optical lens emits a (ideally, but not necessarily parallel) light beam. The direction of propagation of this beam is defined by the spatial position of the activated pixel relative to the associated optical lens. Accordingly, for targeted control of the direction of propagation of a respective light, several pixels of the display unit are assigned to each lens of the lens field unit. Suitably choosing the activated and thus light generating pixel allows the propagation direction of the generated light and thus by interaction of several pixels of an image information to be controlled accordingly. Thus, a spatiotemporal light field, a 5D light field with controllable directionality, can be generated, which includes two spatial dimensions, two angular dimensions and one time dimension. A time-constant light field can be generated accordingly as a 4D light field with controllable directionality.

The spatial resolution of the light field generation device corresponds to the number of individual optical lenses of the lens field unit. The angular resolution or directional resolution of the light field generation device is determined by the number of pixels associated with each individual optical lens. Consequently, the total number of pixels of the display unit corresponds to the product of the (ideal) spatial resolution with the (ideal) directional resolution of the light field generation device.

The method of calibration in this case comprises first generating light through one or more pixels of the display unit according to a predetermined calibration pattern. This is followed by a detection of the light generated according to the calibration pattern by a measuring unit, for example a camera, of a calibration device which is arranged in a predetermined spatial relation to the light field generating device. The predetermined spatial relation comprises a predetermined relative position of the measuring unit to the light field generating device as well as a predetermined relative orientation of the measuring unit to the light field generating device. Depending on the predetermined calibration pattern and the predetermined spatial relation, a respective calculation of a deflection angle of the lens unit for the pixel or pixels that have generated light according to the calibration pattern is then performed by a calculation unit of the calibration device based on the detected light. Finally, the calibration of the light field generating device is performed using at least one calculated deflection angle (i.e., the calculated deflection angle or one of the calculated deflection angles or a plurality of the calculated deflection angles or all of the calculated deflection angles) with an assignment of respective deflection angles of the lens field unit to at least a majority of the pixels of the display unit in the control unit of the light field generating device. By a majority of the pixels is meant here at least 50%, preferably at least 70%, particularly preferably at least 90% of the pixels of the display unit.

Thus, in the method, by means of a position coding represented in the calibration pattern, those pixels or groups of pixels are determined which emit light in a certain direction, i.e. corresponding to a certain deflection angle of the lens field unit. Here, even a single individual measurement can be sufficient to determine this assignment for all controllable radiation directions. However, depending on the desired accuracy, any number of individual measurements from any number of directions can be evaluated together to realize an optimum radiation pattern or optimum control of the radiation pattern. With such calibration, accurate control of millions of individual light beams can be achieved quickly and flexibly.

An important advantage of the method is that it does not depend on a special optical quality of the lens field unit or on a special accuracy of its arrangement relative to the display unit. Indeed, optical irregularities in the lens field unit and/or variations in the mounting accuracy of the lens field unit can also be compensated for by the method described. Even lens field units having optical lenses of varying sizes of can be used. Also, the method is not limited to a specific focal length of the lenses, so the light field generation device can be easily adapted to specific tasks. Due to the achieved tolerances, low-cost and reliable standard components can also be used, so that the light field generation device can be used in new fields of application without much development effort, i.e. quickly and easily.

Since the optical properties of the individual optical lenses of the lens field unit are subject to strong fluctuations, especially in their respective edge areas, the proposed method is also superior to previous calibration methods, in which the lens field unit or the lens array is already placed with the optical lenses in front of the assigned pixels with a precise fit during production. Due to the edge effects of the optical lenses, only a blurred 3-D image can be generated there in the area of the large radiation or deflection angles, i.e. for lateral viewers. Thus, the beam angles that can be selected for a sharp 3-D image are severely limited compared to the solution proposed here, which means that the number of adjustable or addressable beam directions, i.e., the angular resolution, is also greatly reduced compared to the solution proposed here.

Accordingly, the proposed method can also be demonstrated, for example, by taking several samples from a light field generating device series, and relating an accuracy of the relative arrangement between the display unit and the lens field unit to the image sharpness or the maximum size of the different beam angles and the number of addressable beam directions.

Due to the flexibility of the calibration method described, it is possible, for example, to use particularly large individual optical lenses in the lens field unit without calibration being problematic. In this way, the number of pixels of the display unit assigned to a lens and thus the number of individually controllable radiation directions can be increased considerably without the image sharpness suffering or a disproportionately large calibration effort having to be made. As a result, a light field generating device can easily be realized which can distinguish between 1600 different directions, i.e. can emit light individually and precisely in 1600 different directions. For example, arrays of 40×40 pixels can be assigned to each lens. The light field generated by the light field generation device is then directionally denser by almost two orders of magnitude than the light fields generated by previously known light field generation devices.

In the field of application of scientific or industrial visual inspection, the optical inspection of samples, such adaptable illumination can be used to generate a sample-specific light field from many spatial positions with many angular directions at the same time, which highlights the features of the sample with maximum contrast. Existing lighting systems in or on buildings, i.e. illumination devices for illuminating interior and or exterior spaces, can also be simplified or combined with such a calibrated light field generation device. Thus, a single light field generating device can be used to simultaneously realize a variety of different lighting modalities, which can replace a large amount of specialized lighting systems.

Calibrated light field generation devices of this type can also be advantageously used in the field of notification devices. This is because currently, either several different screens or signs are used for different viewing directions, or staggered notifications are used to inform different groups of people, for example in a stadium or in public spaces. By using light field generation devices calibrated as described, specific information can be presented simultaneously via a single light field generation device visible from multiple different viewer groups to the different viewer groups viewing the light field generation device from different viewing directions. This allows, for example, a large central light field generation device to replace many normal monitors or screens.

The known technologies can also be advantageously improved in the field of advertising devices for displaying advertising notices or advertising information with the calibration described. In this context, the well-known lenticular advertising panels, the so-called "flip images", come closest to the effect realized via the light field generation device. However, due to their principle, these can only display static 3D objects from a few viewing directions. The advantage of using the light field generation device calibrated with the described method is the display of time-variable three-dimensional images, which are much more eye-catching for the viewer.

In the field of camouflage, the proposed calibration allows the use of light field generation device for effective camouflage of even larger objects, such as vehicles or buildings, from observers coming from different directions. In this case, the object to be camouflaged can be masked by displaying the background matching the respective viewing direction by the light field generation device. In this case, it is particularly advantageous if the pixels of the display unit are (especially also) designed to generate light in the infrared spectral range.

Finally, such calibrated light field generation devices can also replace normal windows by displaying a real, viewing angle-dependent view of a (virtual or real) environment behind the supposed window by the respective light field generation device. In the field of building technology, this allows for the realization of more energy-efficient buildings in which real windows can be dispensed with. It can also be used to improve well-being in underground complexes, for example. Also, in countries with few hours of sunshine, a day can be virtually extended. By saving windows in vehicle construction, for example aircraft construction, structural improvements relating to stiffness can also be achieved.

Accordingly, in an advantageous embodiment, it is provided that the calibration comprises or is an optical calibration and/or opto-electronic calibration and/or electronic calibration in the control unit, i.e. preferably does not comprise mechanical calibration. This allows manufacturing tolerances to be significantly increased when arranging the lens field unit on the display unit.

In a particularly advantageous form of expression, it is provided that the majority of the pixels of the display unit to which the deflection angles of the lens field unit are assigned also include pixels which have not generated light according to the calibration pattern. This has the advantage that calibration is particularly fast.

In another particularly advantageous embodiment, it is provided that the calibration of the light field generation device is performed using at least one calculated deflection angle, in particular exactly one calculated deflection angle, in conjunction with a predetermined calculation model of the light field generation device. The use of the predetermined calculation model enables a particularly accurate calibration with a small number, in particular already with exactly one calculated deflection angle. Therefore, it is also particularly fast.

In particular, a number of optical lenses of the lens field unit and/or a description of a geometrical arrangement of the optical lenses of the lens field unit and/or one or more optical properties of respective, i.e. one, some, several or all, optical lenses of the lens field unit is quantified by the predetermined calculation model. In particular, the one or more optical properties include a respective size, such as a diameter, and/or a respective focal length and/or a respective chromatic aberration and/or a respective spherical aberration and/or a respective distortion and/or a respective coma and/or a respective axial astigmatism. This has the advantage that calibration can be carried out with particularly high accuracy even based on only a very few, in particular exactly one calculated deflection angle with the given calculation model.

In a particularly advantageous embodiment, it is provided that the calculation model is specified by the calculation unit using calculated deflection angles, i.e. is calculated or, if a computational model is already available, is improved. The deflection angles used for presetting the calculation model are preferably not used for calibration. This has the advantage that the model or the above-mentioned quantities quantified in the model are determined based on measurements, and are thus particularly accurate, while minimizing the a priori knowledge required. This is also advantageous for automating the calibration process, i.e. particularly advantageous if the calibration process described is a partially or fully automated calibration process.

In another advantageous embodiment, it is provided that the calibration pattern is a time-varying calibration pattern so that, according to the calibration pattern, different pixels produce different amounts of light at different times. Alternatively or complementarily, the calibration pattern is a spectrally varying calibration pattern such that, according to the calibration pattern, different pixels at the same times or different pixels at different times or the same pixels at different times generate different amounts of light of different wavelengths. This has the advantage of improving and accelerating the accuracy of the calibration process.

In another advantageous embodiment, it is provided that the detection of the light generated according to the calibration pattern by the measuring unit takes place in exactly one predetermined spatial relation. This has the advantage that the measurement setup is particularly simple and calibration can be performed particularly quickly. Especially if the calibration pattern is a time varying calibration pattern and/or a spectrally varying calibration pattern, a good calibration result can still be achieved quickly. Alternatively, the detection of the light generated according to the calibration pattern for the measuring unit can be performed in several different predetermined spatial relations, which increases the accuracy of the calibration.

Another aspect relates to a light field generation device comprising a display unit having pixels for generating light and a lens field unit having optical lenses for deflecting light generated by the display unit, and a control unit for controlling the display unit, wherein each lens of the lens field unit is associated with a plurality of pixels of the display unit. In this regard, the light field generation device is calibrated using a method according to one of the described embodiments.

Advantages and advantageous embodiments of the light field generating device correspond to advantages and advantageous embodiments of the described method and vice versa.

Thus, in an advantageous embodiment of the light field generating device, it is provided that at least nine pixels of the display unit are associated with each optical lens of the lens field unit. Preferably, at least 16 pixels or at least 100 pixels or at least 1000 pixels of the display unit can each be assigned to an optical lens of the lens field unit. This has the advantage that a particularly large directional resolution is achieved, with a sharp directional image, which is not possible with conventional calibration methods for such a large directional resolution, or only with considerably greater effort. Therefore, for such a light field generating device, the described calibration procedure is particularly advantageous.

In a further advantageous embodiment, it is provided that optical lenses with different optical properties are part of the lens unit. The optical properties may be or include those listed above. For example, the lens field unit may have lenses of different sizes, especially different diameters. The lens field unit can therefore be of such non-uniform nature without any significant disadvantages resulting therefrom, since the calibration procedure described inherently compensates or can compensate for such different properties. Therefore, the calibration procedure described is also particularly advantageous for such a light field generation device.

In another advantageous embodiment, it is provided that by means of a respective optical shielding unit the optical lenses are optically shielded from pixels not assigned to them. The respective shielding units may include, for example, simple orifices. This has the advantage that over-radiation of the pixels in optical lenses not assigned to them is prevented, which in turn is beneficial for image sharpness especially at large viewing angles. Therefore, the calibration procedure described is also particularly advantageous for such a light field generation device.

In a further advantageous embodiment, it is provided that the pixels of the display unit are designed to generate a light with wavelengths in the ultraviolet spectral range and/or with wavelengths for in the spectral range visible to humans and/or with wavelengths in the infrared spectral range, as already explained at the beginning. This has the advantage of a particularly broad applicability of the corresponding light field generating device, which is why the described calibration method is also particularly advantageous for such a light field generating device.

In another advantageous embodiment, it is provided that the lens field unit is designed to deflect the light generated by the display unit in two different spatial planes. Preferably, the different spatial planes are perpendicular to each other. For this purpose, the respective individual optical lenses of the lens field unit may be spherical lenses, whereas, in contrast, cylindrical lenses are sufficient if the lens field unit is designed to deflect the light generated by the display unit in only one spatial plane. This again increases the possible applications, whereby the described calibration procedure is again particularly advantageous here, since the conventional exact positioning is particularly error-prone with lens field unit with spherical or other lenses, which can deflect light in two different spatial planes.

Further aspects concern the application of a respective light field generating device according to one of the described embodiments in different devices, for example as part of a visual inspection device for optically inspecting a sample or a specimen, and/or as part of an illumination device for directionally illuminating an interior space and/or an exterior space, and/or as part of a notification device for directionally displaying safety and/or warning and/or rescue information, and/or as part of an advertising device for directionally displaying advertising information, and/or as part of a window device for simulating a window in a building or in a vehicle, in particular in an aircraft, and/or as part of a camouflage device for directionally camouflaging an object or a person in one or more spectral ranges.

The features and combinations of features mentioned above in the description, also in the introductory part, and the features and combinations of features mentioned below in the description of the figures and/or shown alone in the figures, can be used not only in the respectively specified combination, but also in other combinations, without departing from the scope of the invention. There are thus also embodiments of the invention to be regarded as encompassed and disclosed, which are not explicitly shown and explained in the figures, but emerge and can be generated from the explained embodiments by means of separate combinations of features. Embodiments and combinations of features are also to be regarded as disclosed, which therefore do not have all the features of an originally formulated independent claim. In addition, embodiments and combinations of features are to be considered disclosed, in particular by the embodiments explained above, which exceed the combinations of features represented in the references of the claims or deviate from the same.

The subject according to the invention is to be explained in more detail with the aid of the schematic drawings shown in the following figures, without wishing to restrict it to the specific embodiments shown here.

Figure 2:
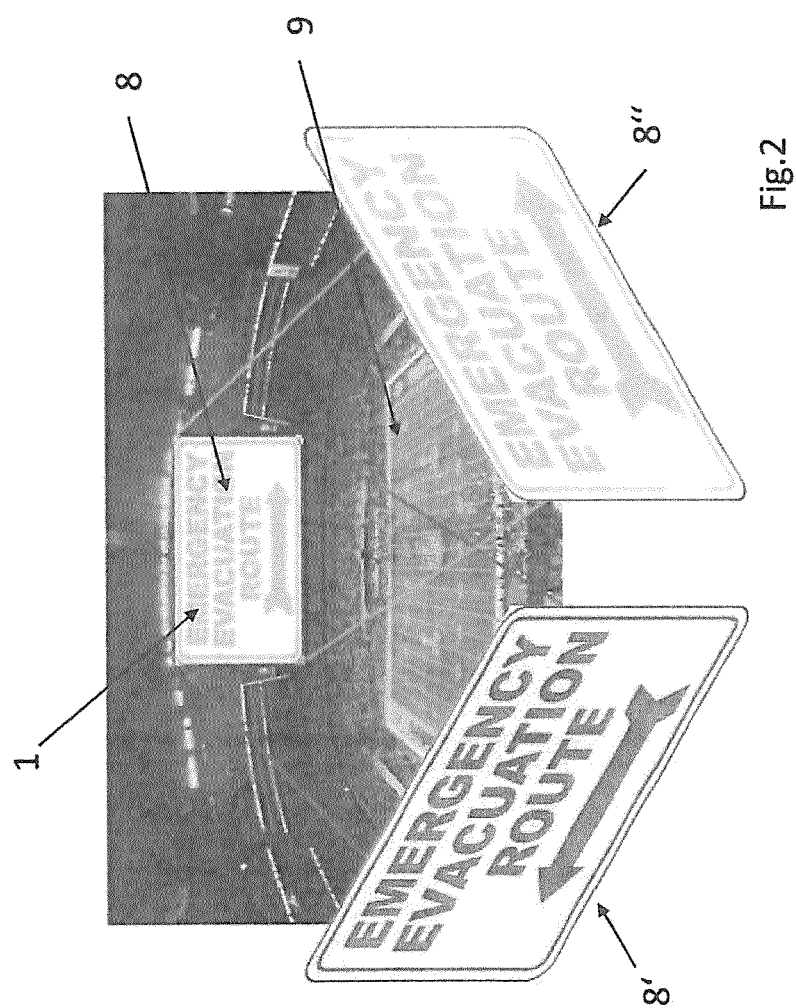

Shown are:

FIG. 1 an exemplary embodiment of a light field generation device;

FIG. 2 an exemplary application of a light field generation device as a notification device for the direction-dependent display of a safety indication.

Identical or functionally identical features are provided with the same reference signs in the figures.

FIG. 1 shows an exemplary embodiment of a light field generation device. The light field generation device 1 has a display unit 2 with pixels 3 for generating light 4. The light field generating device 1 also has a lens field unit 5 with optical lenses 6 for deflecting the light 4 generated by the display unit 2. The lens field unit 5 is arranged parallel to the flat display unit 2 at a distance d, which corresponds to the focal length of the optical lenses 6. The display unit 2 and the lens field unit 5 thus have parallel main extension planes, which both run in the xy-plane. Here, the light field generating device 1 also has a control unit 7 for controlling the display unit 2. Each lens 6 of the lens field unit 5 is assigned several pixels 3, in this case 4×4=16 pixels 3, of the display unit 2. The light 4 of the pixels 3 assigned to a lens 6 is deflected as a parallel beam in 16 different spatial directions. By coordinated activation of the pixels 3, an image 8 can thus be displayed with the light field generation device, which looks different from here 16 different viewing directions.

Here, the light field generation device 1 was calibrated by a) generating the light 4 by the pixel(s) 3 of the display unit 2 according to a predetermined calibration pattern, b) detecting the light 4 generated according to the calibration pattern by a measuring unit of a calibration device which is arranged in a predetermined spatial relation to the light field generating device 1, c) respectively calculating a deflection angle of the lens field unit 5 for the pixel or pixels 3 which have generated light according to the calibration pattern, based on the detected light 4 by a calculation unit of the calibration device depending on the predetermined calibration pattern and the predetermined spatial relation, d) calibrating the light field generating device 1 using at least one calculated deflection angle with an assignment of respective deflection angles of the lens field unit 1 to at least a majority of the pixels 3 of the display unit 2 in the control unit 7 of the light field generating device 1. As a result, sharp three-dimensional images 8 with a large number of different viewing directions and large deflection and thus viewing angles are achievable here even with large mounting tolerances of the position of the lens field unit 5 relative to the display unit 2, i.e., for example, with the lens field unit 5 twisted or displaced in the xy-plane, even for large-area light field generating devices 1.

An example is shown here in FIG. 2, where the light field generating device 1 is a central display panel in a stadium 9. Here, the image 8 comprises two partial images 8', 8", which indicate the respective path to the next emergency exit for viewers who are located in the direction assigned to the corresponding image 8', 8" relative to the light field generation device 1 designed as an notification device.

The invention claimed is:

1. A method for calibrating a light field generating device, which has a display unit with pixels for generating light and a lens field unit with optical lenses for deflecting the light generated by the display unit, and a control unit for controlling the display unit, each lens of the lens field unit being assigned a plurality of pixels of the display unit, the method having the following steps:
   a) generating light through one or more pixels of the display unit according to a predetermined calibration pattern;
   b) detecting the light generated according to the calibration pattern by a measuring unit of a calibration device which is arranged in a predetermined spatial relation to the light field generating device;
   c) respectively calculating a deflection angle of the lens field unit for the pixel or pixels which have generated light according to the calibration pattern, on the basis of the detected light by a calculation unit of the calibration device in dependence on the predetermined calibration pattern and the predetermined spatial relation; and d) calibrating the light field generating device by utilizing at least one calculated deflection angle and a predetermined calculation model of the light field generating device with an assignment of respective deflection angles of the lens field unit to at least a majority of the pixels of the display unit in the control unit of the light field generating device, wherein a number of optical lenses of the lens field unit and/or a description of a geometrical arrangement of the optical lenses of the lens field unit and/or one or more properties of respective optical lenses of the lens field unit is/are quantified by the predetermined calculation model.

2. The method according to claim 1, wherein the calibration according to method step d) comprises or is an optical calibration or opto-electronic calibration in the control unit.

3. The method according to claim 1, wherein the majority of the pixels of the display unit to which the deflection angles of the lens field unit is assigned also comprises pixels which have not generated light according to the calibration pattern.

4. The method according to claim 1, wherein the one or more properties comprises or comprise a respective size and/or a respective focal length and/or a respective chromatic aberration and/or a respective spherical aberration and/or a respective distortion and/or a respective coma and/or a respective axial astigmatism.

5. The method according to claim 1, wherein the calculation model is specified by the calculation unit using calculated deflection angles.

6. The method according to claim 1, wherein the calibration pattern is a time-varying calibration pattern and/or the calibration pattern is a spectrally varying calibration pattern.

7. The method according to claim 1, wherein the detection of the light generated according to the calibration pattern by the measuring unit according to step b) takes place in exactly one predetermined spatial relation.

8. A light field generating device comprising a display unit having pixels for generating light and a lens field unit having optical lenses for deflecting the light generated by the display unit, and a control unit for controlling the display unit, wherein each lens of the lens field unit is associated with a plurality of pixels of the display unit, wherein the light field generating device is calibrated by the method according to claim 1.

9. The light field generating device according to claim 8, wherein each optical lens is assigned at least 9 pixels.

10. The light field generating device according to claim 8, wherein optical lenses with different properties are part of the lens field unit.

11. The light field generating device according to claim 8, wherein the optical lenses are optically shielded from pixels not assigned to them by a respective shielding unit.

12. The light field generating device according to claim 8, wherein the pixels of the display unit are designed to generate a light with wavelengths in the ultraviolet spectral range and/or with wavelengths in the visible spectral range and/or with wavelengths in the infrared spectral range.

13. The light field generating device according to claim 8, wherein the lens field unit is designed to deflect the light generated by the display unit in two different spatial planes.

14. A visual inspection device for optically inspecting a sample, or illumination device for illuminating an interior space and/or an exterior space, or notification device for displaying safety or warning or rescue notifications, or advertising device for displaying advertising notices, or window device for simulating a window in a building or a vehicle, or camouflage device for camouflaging an object or a person in one or more spectral ranges, having a light field generation device of claim 8.

* * * * *